United States Patent
Chau et al.

(10) Patent No.: US 11,455,801 B2
(45) Date of Patent: Sep. 27, 2022

(54) GENERATING SIGNATURES WITHIN A NETWORK THAT INCLUDES A PLURALITY OF COMPUTING DEVICES OF VARYING PROCESSING CAPABILITIES

(71) Applicant: Avigilon Corporation, Vancouver (CA)

(72) Inventors: Alexander Chau, Coquitlam (CA); Ken Jessen, New Westminster (CA); Shaun P. Marlatt, North Vancouver (CA)

(73) Assignee: AVIGILON CORPORATION

( * ) Notice: Subject to any disclaimer, the term of this patent is extended or adjusted under 35 U.S.C. 154(b) by 55 days.

(21) Appl. No.: 16/205,643

(22) Filed: Nov. 30, 2018

(65) Prior Publication Data
US 2019/0171885 A1 Jun. 6, 2019

Related U.S. Application Data

(60) Provisional application No. 62/594,884, filed on Dec. 5, 2017.

(51) Int. Cl.
*G06V 20/40* (2022.01)
*H04N 7/18* (2006.01)
*G06T 1/20* (2006.01)

(52) U.S. Cl.
CPC .............. *G06V 20/46* (2022.01); *G06T 1/20* (2013.01); *H04N 7/181* (2013.01)

(58) Field of Classification Search
CPC .. G06K 9/00744; G06K 9/00771; G06T 1/20; H04N 7/181; H05B 37/0272
See application file for complete search history.

(56) References Cited

U.S. PATENT DOCUMENTS

| | | | | |
|---|---|---|---|---|
| 2011/0164045 A1* | 7/2011 | Costa | .................... | G06F 1/3203 345/502 |
| 2011/0211036 A1* | 9/2011 | Tran | ....................... | G06N 3/063 348/14.08 |
| 2013/0111337 A1* | 5/2013 | Deng | ................. | G06K 9/00248 715/255 |
| 2014/0055470 A1* | 2/2014 | Diard | ....................... | G06F 9/44 345/520 |
| 2014/0267271 A1* | 9/2014 | Billeter | ................ | G06T 15/005 345/426 |
| 2016/0026855 A1* | 1/2016 | Mazumdar | ............. | H04N 7/181 348/143 |
| 2017/0061643 A1* | 3/2017 | Sugaya | .................... | G06T 7/73 |

(Continued)

OTHER PUBLICATIONS

Bromley, et al., "Signature Verification Using a "Siamese" Time Delay Neural Network", International Journal of Pattern Recognition and Artificial Intelligence, vol. 7, No. 4, (1993) pp. 669-688.

(Continued)

*Primary Examiner* — James T Boylan

(57) ABSTRACT

Generating signatures within a network that includes a plurality of computing devices of varying processing capabilities is disclosed. Chips may be transmitted, from a network video recorder and over the network, to an analytics appliance having a GPU processing power that is higher than a GPU processing power possessed by the network video recorder. The GPU processing power possessed by the analytics appliance may be employed to process the chips therein and generate respective signatures.

4 Claims, 4 Drawing Sheets

(56) References Cited

U.S. PATENT DOCUMENTS

2017/0372153 A1\* 12/2017 Justice ................. G06K 9/4628
2018/0157939 A1  6/2018 Butt et al.
2018/0232900 A1\* 8/2018 Kraft ................... G06K 9/6277

OTHER PUBLICATIONS

Dextro, "Introducing the Dextro Video Analysis API", Mar. 19, 2016 (Wayback Machine date), https://web.archive.org/web/20160319195342/http://research.detro.com/video-analysis/.

Hikvision, "NXI-I8/16S", Jul. 5, 2017 (Wayback Machine date), https://web.archive.org/web/2017070505149/http://www.hikvision.com/en/Products_accessries_829_i6359.html#prettyPhoto[iframes]/0/.

"NVR Vs. DVR—What's The Difference?", Swann Communications Pty. Ltd., Jun. 13, 2018, retrieved from https://www.swann.com/blog/dvr-vs-nvr-whats-the-difference/.

\* cited by examiner

GENERATING SIGNATURES WITHIN A NETWORK THAT INCLUDES A PLURALITY OF COMPUTING DEVICES OF VARYING PROCESSING CAPABILITIES

RELATED APPLICATION DATA

The present application claims the priority of U.S. provisional patent application No. 62/594,884 filed Dec. 5, 2017 and entitled "GENERATING SIGNATURES WITHIN A NETWORK THAT INCLUDES A PLURALITY OF COMPUTING DEVICES OF VARYING PROCESSING CAPABILITIES", the entire contents of which are herein incorporated by reference.

TECHNICAL FIELD

The present disclosure is directed at methods and systems for generating signatures within a network that includes a plurality of computing devices of varying processing capabilities.

BACKGROUND

Machine-driven semantic analysis has a number of real world applications. In video surveillance applications, semantic analytics is frequently important such as, for example, in the context of feature descriptors and signatures for objects in videos. In this regard, a feature descriptor in computer vision is generally understood to be an algorithm that takes an image and outputs feature descriptions or signatures (an image transformation). Feature descriptors encode information (an image) into a series of numbers to act as a numerical "fingerprint" that can be used to differentiate one feature from another. Ideally this information is invariant under image transformation so that the features could be found again in another image of the same object. Examples of feature descriptor algorithms are SIFT (Scale-Invariant Feature Transform), HOG (Histogram of Oriented Gradients), and SURF (Speeded Up Robust Features).

A signature is, for example, an n-dimensional vector of numerical features (numbers) that represent an image of an object that can be processed by computers. By comparing the signature of one image of one object with the signature of another image, a computer implemented process may determine whether the one image and the other image are images of the same object. The image signatures may be multi-dimensional vectors calculated by, for example, convolutional neural networks.

SUMMARY

According to one example embodiment, there is provided a surveillance system that includes a camera that captures video frames and a VMS server stored on a computer readable medium in a first computing device housed in a first enclosure. The first computing device is communicatively coupled to the camera. The surveillance system also includes a second computing device that is housed in a second enclosure different than the first enclosure, and the second computing device includes a plurality of Graphics Processing Unit (GPU) cards. The second computing device is communicatively coupled to the first computing device, and the second computing device is configured to employ the plurality of GPU cards to generate signatures corresponding to objects of interest in the video frames and return the generated signatures to the first computing device for storage and use therein.

According to another example embodiment, there is provided a method that includes generating a plurality of chips from video frames captured by a camera that is communicatively coupled to a first computing device within a surveillance system. The method also includes transmitting the chips, from the first computing device and over a Local Area Network (LAN), to a second computing device having a GPU processing power that is higher than a GPU processing power possessed by the first computing device. The method also includes employing the GPU processing power possessed by the second computing device to process the chips therein and generate respective signatures. The method also includes transmitting the generated signatures, from the second computing device and over the LAN, to the first computing device for storage and use therein.

According to another example embodiment, there is provided a method that includes generating a plurality of chips from video frames captured by a camera that is communicatively coupled to a network video recorder within a surveillance system. The method also includes transmitting the chips, from the network video recorder and over a network, to an analytics appliance having a GPU processing power that is higher than a GPU processing power possessed by the network video recorder. The method also includes employing the GPU processing power possessed by the analytics appliance to process the chips therein and generate respective signatures. The method also includes transmitting the generated signatures, from the analytics appliance and over the network, to the network video recorder for storage and use therein.

According to another aspect, there is provided a non-transitory computer readable medium having stored thereon computer program code that is executable by a processor and that, when executed by the processor, causes the processor to perform the method of any of the foregoing aspects or suitable combinations thereof.

BRIEF DESCRIPTION OF THE DRAWINGS

Reference will now be made, by way of example, to the accompanying drawings.

Similar or the same reference numerals may have been used in different figures to denote similar example features illustrated in the drawings.

DETAILED DESCRIPTION OF EXAMPLE EMBODIMENTS

Figure 1:
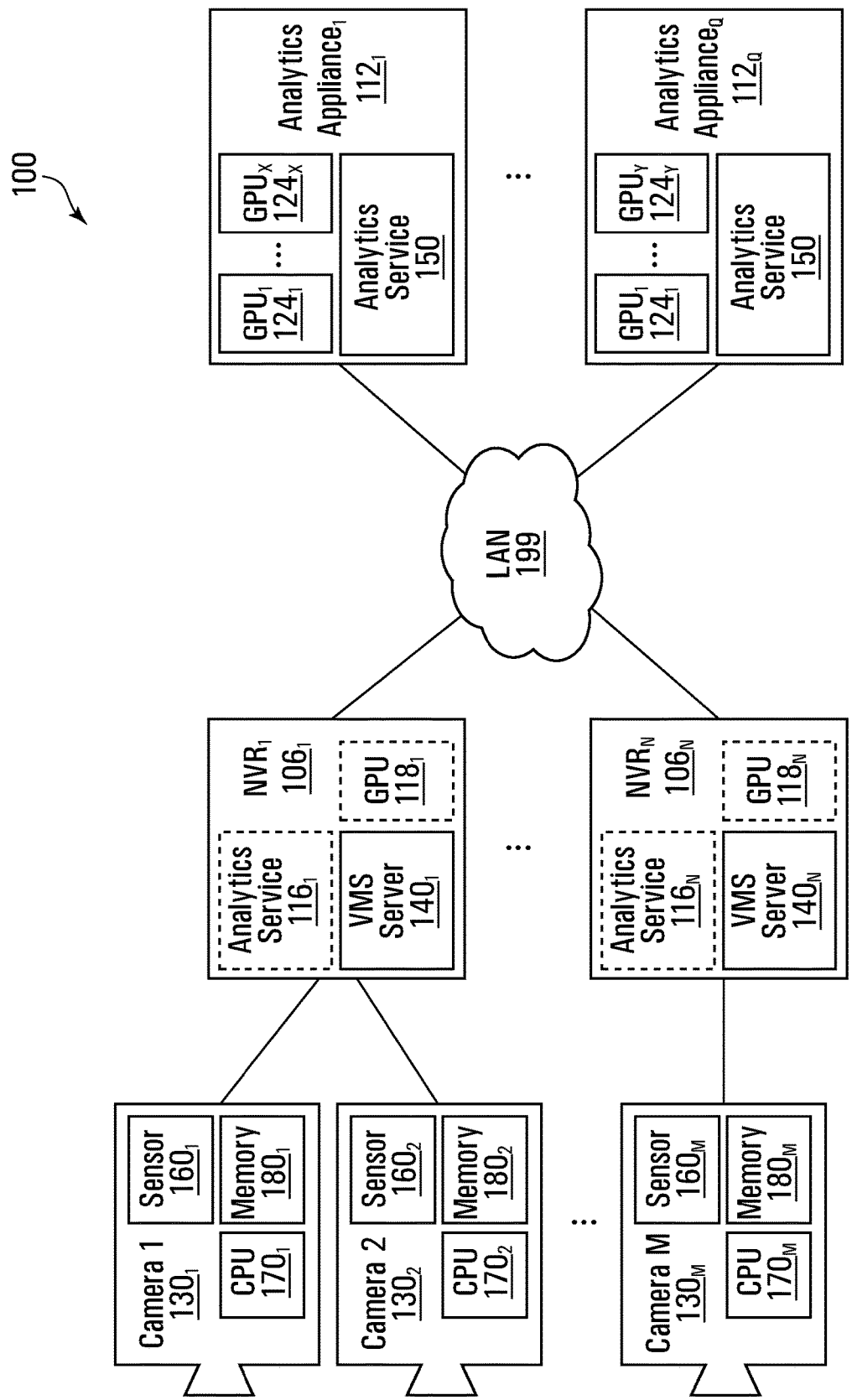
FIG. 1 shows a block diagram illustrating a network layout of a surveillance system in accordance with example embodiments.

Numerous specific details are presently set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. Other words used to describe the relationship between elements should be interpreted in a like fashion (i.e., "between" versus "directly between", "adjacent" versus "directly adjacent", etc.).

The term "and/or" herein when used in association with a list of items means any one or more of the items comprising that list.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects. Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The actual programming language selected is a matter of design choice and, as will be appreciated by those skilled in the art, any suitable programming language can be utilized.

Various example embodiments are described below with reference to flowchart illustration(s) and/or block diagrams of methods, apparatus (systems) and computer program products according to various embodiments. Those skilled in the art will understand that various blocks of the flowchart illustration(s) and/or block diagrams, and combinations of blocks in the flowchart illustration(s) and/or block diagrams, can be implemented by computer program instructions (the specific code details in this regard are not required for the skilled person to understand example embodiments). These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act herein specified.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts herein specified.

This disclosure describes various example embodiments. It is contemplated that, to the extent that a person skilled in the art would understand it to be feasible, any part of any example embodiment described herein may be implemented or combined with any part of any other example embodiment described herein.

Those skilled in the art will appreciate that a plurality of sequential image frames may together form a video captured by the video capture device. Each image frame may be represented by a matrix of pixels, each pixel having a pixel image value. For example, the pixel image value may be a single numerical value for grayscale (such as, for example, 0 to 255) or a plurality of numerical values for colored images. Examples of color spaces used to represent pixel image values in image data include RGB, YUV, CYKM, YCBCR 4:2:2, YCBCR 4:2:0 images.

The term "object" as used herein is understood to have the same meaning as would normally be given by one skilled in the art of video analytics, and examples of objects may include humans (for example, full bodies or alternatively something partial like faces), vehicles, animals, etc.

The GPU processing power needed by high performance semantic analytics in video surveillance applications is increasing. For example, as video analytics becomes more advanced in the future, the more advanced video cameras will generate more and more so-called "chips per camera". (A "chip" will be understood by those skilled in the art to be, for example, a "cropped bounding box".) As this occurs, these chips can be sent to servers for signature generation; however a potential issue is that the GPU processing power existing in traditional system arrangements may become insufficient (i.e. if the load is too great).

"Metadata" or variants thereof herein refers to information obtained by computer-implemented analyses of images including images in video. For example, processing video may include, but is not limited to, image processing operations, analyzing, managing, compressing, encoding, storing, transmitting, and/or playing back the video data. Analyzing the video may include segmenting areas of image frames and detecting visual objects, and tracking and/or classifying visual objects located within the captured scene represented by the image data. The processing of the image data may also cause additional information regarding the image data or visual objects captured within the images to be output. That additional information is commonly referred to as "metadata". The metadata may also be used for further processing of the image data, such as drawing bounding boxes around detected objects in the image frames.

A surveillance system in accordance with some example embodiments includes a video capture and playback system that includes network-addressable devices as herein described.

In accordance with a number of example embodiments, a surveillance system includes a number of Network Video Recorders (NVRs) and at least one dedicated GPU appliance, where the GPU appliance is shared amongst the NVRs to enable the whole system to provide sufficient GPU processing power demanded by high performance semantic analytics in video surveillance applications. Thus, a dedicated GPU appliance may be shared amongst a number of Network Video Recorders (NVRs) to address the problem of providing sufficient GPU processing power demanded by high performance semantic analytics in video surveillance applications.

In accordance with a number of example embodiments, a dedicated GPU appliance as herein described may provide scalable processing of video analytics from a multitude of network-connected devices within for example, one site (or two or more geographically proximate sites), where the surveillance system is deployed.

In accordance with a number of example embodiments, a dedicated GPU appliance as herein described may, upon addition to site where the surveillance system is deployed, minimize disruption to the existing network-connected devices as compared to trying to augment the overall GPU processing power of the system in some other manner.

NVR(s) and Analytics Appliance(s) Included in Network

FIG. 1 is a block diagram that illustrates a network layout of a surveillance system 100 in accordance with a number of example embodiments. As shown, there are N NVRs $106_1$-$106_N$ (where N is any suitable number greater than zero). Also as shown, there are Q analytics appliances $112_1$-$112_Q$ where Q is any suitable number greater than zero. Note that in FIG. 1 the illustrated GPU and analytics service module within each NVR (GPU $118_1$, analytics service module $116_1$, GPU $118_2$, analytics service module $116_2$, etc.) are shown in dashed lines as they are each optionally contained in their respective NVR (noting that if there is a GPU within an illustrated NVR then there will be an analytics service module as well and vice versa for the case where the GPU is not within the NVR).

Regarding the analytics appliances $112_1$-$112_Q$ shown in FIG. 1, each contains a suitable number of GPU cards greater than one. For example, analytics appliance $112_1$ contains X GPU cards $124_1$-$124_X$, where X is any suitable number greater than one. As another example, analytics appliance $112_Q$ contains Y GPU cards $124_1$-$124_Y$, where Y is any suitable number greater than one (noting that Y does not necessarily equal X). The GPU cards within any one particular analytics appliance need not necessarily be all of the same type or have the same processing power. Within a single analytics appliance enclosure, there may be a mixture of GPU cards (types and processing power) as with respect to none, one, some or all of the analytics appliances $112_1$-$112_Q$.

In accordance with at least one example embodiment, a number of Convolution Neural Networks (CNNs) are each running on a respective one of the GPU cards. In accordance with at least one alternative example embodiment, one or more CNNs may span a plurality of the GPU cards. Whether or not a CNN spans a plurality of the GPU cards or is running on only one GPU cards may depend on whether the particular CNN can exploit the processing resources of a plurality of GPU cards. In at least one example embodiment the surveillance system includes:

a first CNN having first function(s) that runs on a single graphics card which may be within either one of the NVRs $106_1$-$106_N$ or one of the analytics appliances $112_1$-$112_Q$.

a second different CNN having second different function(s) that spans the plurality of graphics cards $124_1$-$124_X$ within one of the analytics appliances $112_1$-$112_Q$.

Generation of signatures can be done in a distributed fashion. It need not be done on the server, but may instead be suitably carried out in a dedicated appliance. The CNN need not be co-resident with one of cameras $130_1$-$130_M$ (where M is any suitable number greater than zero) nor a storage server. Generation of the signatures can be prioritized in a variety of fashions including: i) round robin (equal or no prioritization); and ii) prioritizing a particular camera or a particular storage server.

Generation and Processing of Signatures

By calculating the Euclidean distance between two signatures of two images captured by a camera, a computer implementable process can, for example, determine a similarity score to indicate how similar the two images may be. Neural networks may be trained in such manner that the signatures they compute for images are close (low Euclidian distance) for similar images and far (high Euclidian distance) for dissimilar images. In order to retrieve relevant images, the signature of the query image may be compared with the signatures of the images in a database.

In accordance with some example embodiments, chips can be processed by a learning machine to generate the signatures of the images of the objects captured in the video. In at least some examples, the learning machine is a neural network (such as a CNN) running on at least one GPU. The CNN may be trained using training datasets containing large numbers of pairs of similar and dissimilar images. The CNN may be, for example, a Siamese network architecture trained with a contrastive loss function. See, for instance, the Siamese network described in Bromley, Jane, et al. "Signature verification using a "Siamese" time delay neural network." International Journal of Pattern Recognition and Artificial Intelligence 7.04 (1993): 669-688. Those skilled in the art will understand that other neural networks are contemplated.

As already mentioned, chips may be processed to generate signatures, and the signatures may be indexed and stored in a database with the video. The signatures can also be associated with reference coordinates to where the chips of the objects may be located in the video. Regarding the above-mentioned database, storing in the database may include storing the video with time stamps and camera identification as well as the associated metadata with the signatures of the chips and reference coordinates to where in the video the chips are located.

With reference again to FIG. 1, Video Management Software (VMS) servers $106_1$-$106_N$ are responsible for sending tasks to the analytics appliances $112_1$-$112_Q$ for processing. Also, the VMS is responsible for the workload distribution across available GPUs. In accordance with at least some examples, the VMS interfaces with an analytics service module 150 in one of the analytics appliances 112$_1$-112$_Q$ via an HTTP REST API.

Still with reference to FIG. 1, it will be understood that each illustrated analytics service module 150 can have a measurable processing throughput. As one example in this regard, objects per second may be one quantification of measurable processing throughput.

In accordance with at least one example embodiment, a Visual Recognition Library (VRL) is used to provide abstraction of the GPU card from the respective analytics service. Regarding inter-service GPU balancing, each VRL instance may have its own requests, in which case options for load balancing are: i) round-robin with failover if any queue fails; and ii) shortest queue depth.

In accordance with some example embodiments, the analytics services 116$_1$-116$_N$ within the NVRs and the analytics services 150 within each of the analytics appliances 112$_1$-112$_Q$ are auto-discoverable, thus enabling them to be found more easily since they do not need to be manually found.

Camera(s) in Network

Still with reference to FIG. 1, each of the cameras 130$_1$-130$_M$ includes a respective one of the image sensors 160$_1$-160$_M$ for capturing a plurality of images (although each of the image sensors 160$_1$-160$_M$ is shown as a single block, this is just for convenience of illustration and thus each of the image sensors 160$_1$-160$_M$ may be a single image sensor or alternatively a plurality of image sensors, and the same applies to other blocks within each of the cameras 130$_1$-130$_M$).

Each of the cameras 130$_1$-130$_M$ shown in FIG. 1 may be a digital video camera and the at least one image sensor 160 may output captured light as a digital data. For example, the at least one image sensor 160 may be a CMOS, NMOS, or CCD. In at least one different example embodiment (not depicted), one or more of the cameras 130$_1$-130$_M$ may comprise an analog camera connected to an encoder, with the encoder digitizing analog video captured by the analog camera for subsequent processing.

The at least one image sensor 160 in each of the cameras 130$_1$-130$_M$ may be operable to capture light in one or more frequency ranges. For example, the at least one image sensor 160 may be operable to capture light in a range that substantially corresponds to the visible light frequency range. In other examples, the at least one image sensor 160 may be operable to capture light outside the visible light range, such as in the infrared range and/or ultraviolet range. In other examples, one or more of the cameras 130$_1$-130$_M$ shown in the FIG. 1 may be a multi-sensor camera that includes two or more sensors that are operable to capture light in different frequency ranges.

One or more of the cameras 130$_1$-130$_M$ shown in FIG. 1 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another one of the cameras 130$_1$-130$_M$ shown in FIG. 1. For example, the dedicated camera may be a surveillance camera, such as any one of a pan-tilt-zoom camera, dome camera, in-ceiling camera, box camera, and bullet camera.

Additionally or alternatively, one or more of the cameras 130$_1$-130$_M$ shown in FIG. 1 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each of the cameras 130$_1$-130$_M$ shown in FIG. 1 includes a respective one of processors (CPUs 170$_1$-170$_M$). Each of the cameras 130$_1$-130$_M$ shown in FIG. 1 also includes a respective one of memory devices 180$_1$-180$_M$ coupled to respective processors (co-internally located) and respective one or more network interfaces (co-internally located). The at least one memory device 180 can include a local memory (such as, for example, a random access memory and a cache memory) employed during execution of program instructions. The processor executes computer program instructions (such as, for example, an operating system and/or application programs), which can be stored in the at least one memory device 180.

In various embodiments each of the CPUs 170$_1$-170$_M$ in FIG. 1 may be implemented by any suitable processing circuit having one or more circuit units, including a digital signal processor (DSP), GPU, embedded processor, etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The CPU 170 may include circuitry for storing memory, such as digital data, and may comprise a memory circuit or be in wired communication with a memory circuit, for example.

In various example embodiments, the at least one memory device 180 coupled to the at least one CPU 170 is operable to store data and computer program code. Typically, at least one memory device 180 is all or part of a digital electronic integrated circuit or formed from a plurality of digital electronic integrated circuits. The at least one memory device 180 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The at least one memory device 180 may be operable to store memory as volatile memory, non-volatile memory, dynamic memory, etc. or any combination thereof.

In various example embodiments, a plurality of the components of the camera 130 shown in the block diagram may be implemented together within a system on a chip (SOC). For example, the at least one CPU 170, the at least one memory device 180 and the network interface may be implemented within a SOC. Furthermore, when implemented in this way, a general purpose processor and one or more of a GPU and a DSP may be implemented together within the SOC.

In some example embodiments, one or more of the cameras 130$_1$-130$_M$ perform video analytics on one or more image frames of a video captured by that camera. The video analytics is performed by a video analytics module, within the camera, to determine properties or characteristics of the captured image or video and/or of visual objects found in the scene captured in the video. The video analytics module may operate to carry out a method as follows:

- At least one image frame of the video is segmented into foreground areas and background areas. The segmenting separates areas of the image frame corresponding to moving objects (or previously moving objects) in the captured scene from stationary areas of the scene.
- One or more foreground visual objects in the scene represented by the image frame are detected based on the segmenting as described above. For example, any discrete contiguous foreground area or "blob" may be identified as a foreground visual object in the scene. For example, only contiguous foreground areas greater than a certain size (e.g. number of pixels) are identified as a foreground visual object in the scene.
- Metadata may be further generated relating to the detected one or more foreground areas. The metadata may define the location, reference coordinates, of the foreground visual object, or object, within the image frame. For example, the location metadata may be further used to generate a bounding box (e.g. when encoding video or playing back video) outlining the detected foreground visual object. The image within the bounding box is extracted, called a chip, for inclusion in metadata which along with the associated video may be processed further at other devices on the network. The extracted image, which is the chip, alternately may be smaller then what was in the bounding box or may be larger then what was in the bounding box. The size of the image being extract should be close to, but outside of, the actual boundaries of the object that has been detected. The bounding boxes are typically rectangular in shape. A visual indicator may be added to the image frame to visually identify each of the detected one or more foreground visual objects. The visual indicator may be a bounding box that surrounds each of the one or more foreground visual objects within the image frame.
- The detected foreground visual objects (or objects) may be classified. For example, pattern recognition may be carried out to classify the foreground visual objects. A foreground visual object may be classified by class, such as a person, a car or an animal. Additionally or alternatively, a visual object may be classified by action, such as movement and direction of movement of the visual object. Other classifiers may also be determined, such as color, size, orientation, etc. In more specific examples, classifying the visual object may include identifying a person based on facial detection and recognizing text, such as a license plate.
- Whether an event has occurred (including type of event) may be detected. Detecting the event may be based on a comparison of the classification of one or more foreground visual objects with one or more predefined rules. The event may be an event in anomaly detection or business intelligence, such as whether a video tripwire has been triggered, the number of persons present in one area, whether an object in scene has been left behind or whether an object in the scene has been removed.
- At a point in time after object detection, chips of objects, along with reference coordinates of each of the chips, may be extracted for inclusion in metadata which along with the associated video may be processed as herein described.

Figure 2:
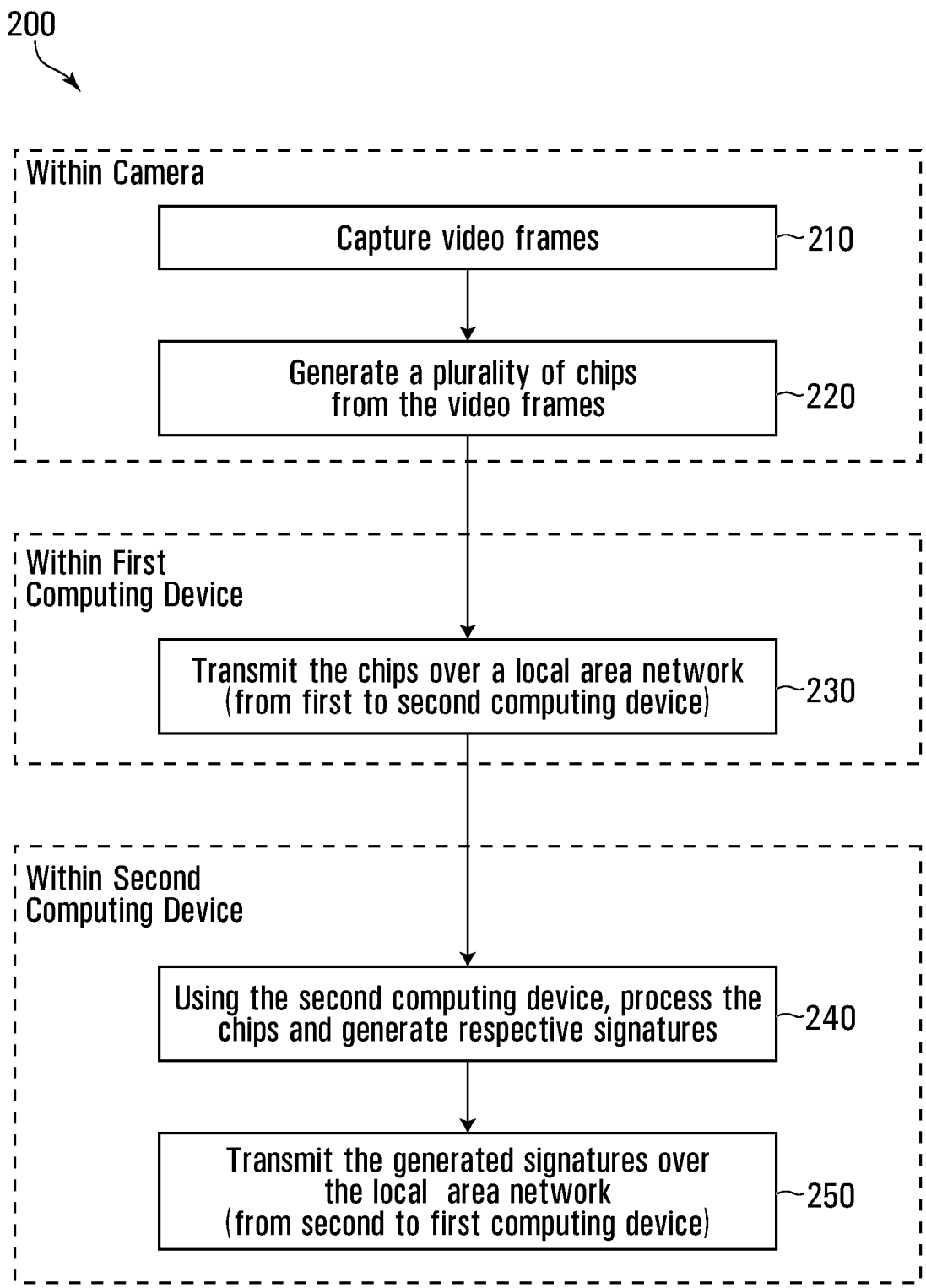
FIG. 2 is a flow chart illustrating a method for signature generation in accordance with an example embodiment.

Reference will now be made to FIG. 2. FIG. 2 illustrates a method 200 for signature generation in accordance with an example embodiment. First, one of the cameras $130_1$-$130_M$ captures (210) video frames. To be suitable for the method 200, the one of the cameras $130_1$-$130_M$ capturing the video frames should be a network-addressable, digital camera.

Next a plurality of chips are generated (220) from the captured video frames. In the method 200, the generating 220 is carried out within the camera that captured the video frames. Also, as explained in more detail previously, the plurality of chips along with the respective captured video (from which the plurality of chips were derived) are transmitted to one of the NVRs $106_1$-$106_N$ (i.e. first computing device) for storage therein. The timing and other specific details of this storage will vary and are not the subject of the present disclosure.

Next the chips are transmitted (230), over a Local Area Network (LAN 199 in FIG. 1), from the first computing device to one of the analytics appliances $112_1$-$112_Q$ (i.e. second computing device). Once within the second computing device, the chips are processed and respective signatures are generated (240). As explained previously herein, the analytics appliance receiving the chips to generate signatures has a higher GPU processing power than the NVR sending the chips.

Next the generated signatures are transmitted (250), over the Local Area Network (LAN), from the second computing device to the first computing device.

Figure 3:
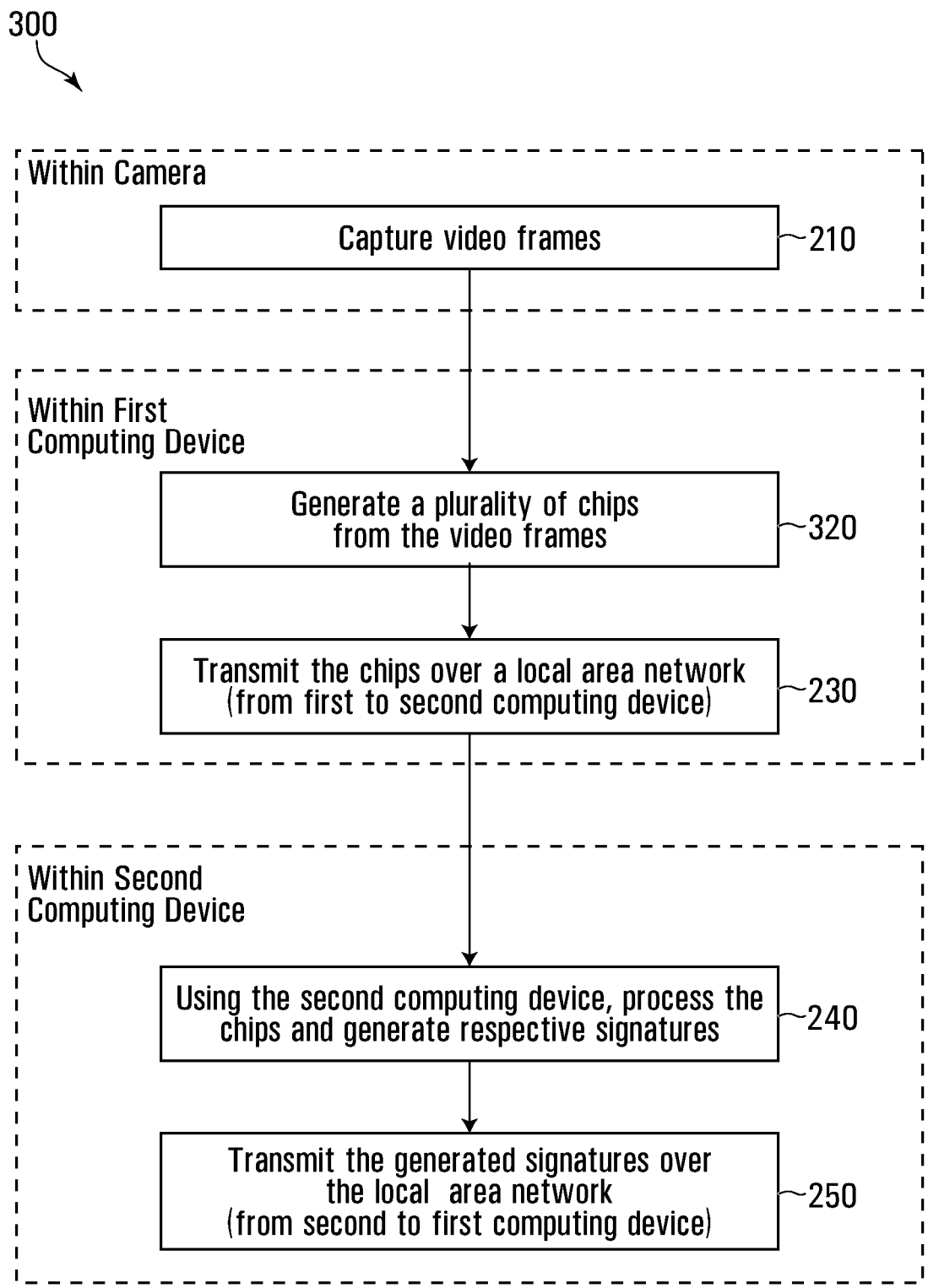
FIG. 3 is a flow chart illustrating a method for signature generation in accordance with an alternative example embodiment.

Reference will now be made to FIG. 3. FIG. 3 illustrates a method 300 for signature generation in accordance with an alternative example embodiment. The method 300 is similar to the method 200 of FIG. 2, except there is no generating 220 of the chips within one of the one of cameras $130_1$-$130_M$. Instead there is generating 330 of the chips with one of the NVRs $106_1$-$106_N$. The type of cameras employed within the surveillance system may be expected to impact which of the method 200 (FIG. 2), the method 300 (FIG. 3) or both is carried out. For example, in the case of a surveillance system which includes one or more analog cameras connected respective encoder(s), the method 300 may be expected.

Figure 4:
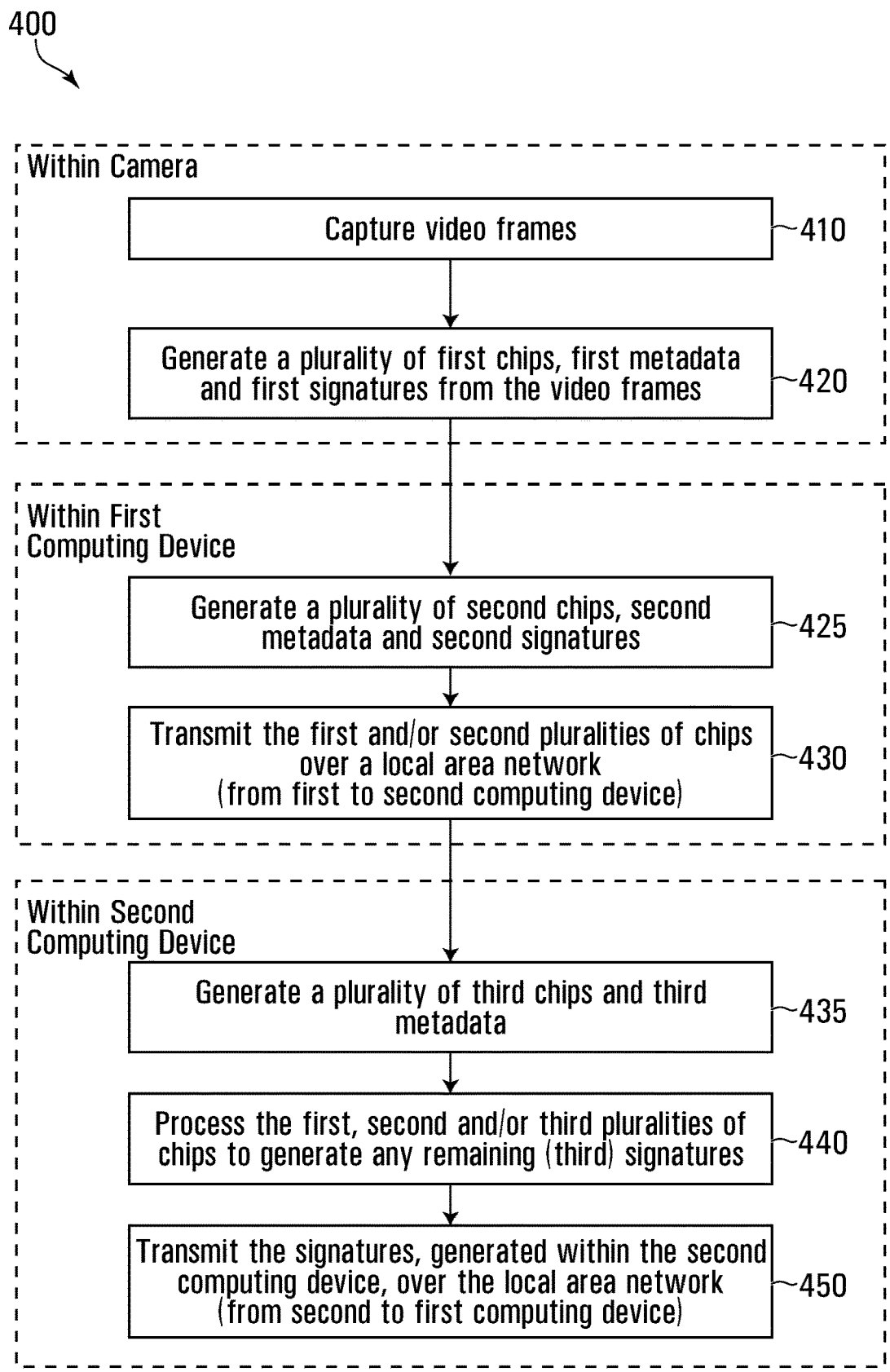
FIG. 4 is a flow chart illustrating a method for signature generation in accordance with another alternative example embodiment.

Reference will now be made to FIG. 4. FIG. 4 illustrates a method 400 for signature generation in accordance with another alternative example embodiment. First, one of the cameras $130_1$-$130_M$ captures (410) video frames. To be suitable for the method 400, the one of the cameras $130_1$-$130_M$ capturing the video frames should be a network-addressable, digital camera.

Next a plurality of first chips, first signatures and first non-signature metadata are generated (420) from the captured video frames. In the method 400, the generating 420 is carried out within the camera that captured the video frames. Also, as explained in more detail previously, the plurality of first chips along with the respective captured video (from which the plurality of first chips were derived) are transmitted to one of the NVRs $106_1$-$106_N$ (i.e. first computing device) for storage therein along with the first metadata and first signatures which are also transmitted. The timing and other specific details of this storage will vary and are not the subject of the present disclosure.

Next the first computing device generates (425) a plurality of second chips, second signatures and second non-signature metadata, which may be in addition to and/or refined versions of the first chips, first signatures and first non-signature metadata respectively. As an example of refinement, it might be detected (in the first computing device stage) that one or more of the first chips generated from the previous camera stage do not contain respective single object(s), but actually plural objects necessitating chip splitting. Also, one or more of the first chips from the previous stage might be rejected in the first computing device stage, possibly triggering re-extraction and replacement of the rejected chip(s). As yet another possibility, first chips might be re-processed to extract certain second chips, where these second chips are chips of sub-objects like the license plate from a vehicle chip, or the face from a person chip.

Next the first and/or second pluralities of chips are transmitted (430), over a LAN (such as, for example, the LAN 199 in FIG. 1), from the first computing device to one of the analytics appliances $112_1$-$112_Q$ (i.e. second computing device). Once within the second computing device, the received chips are processed, along with any third chips generated (435) within the second computing device, and respective signatures are generated (440) from the processed first, second and/or third pluralities of chips.

Next the generated signatures are transmitted (450), over the LAN, from the second computing device to the first computing device.

Certain adaptations and modifications of the described embodiments can be made. For example, although the example embodiment illustrated in FIG. 4 shows non-signature metadata being generated in each of the camera stage, the first computing device stage and the second computing device stage, this is not mandatory and any non-signature metadata generation could be limited to some suitable subset of stages less than all three stages. Similarly, although the example embodiment illustrated in FIG. 4 shows pluralities of chips being generated in each of the camera stage, the first computing device stage and the second computing device stage, this is also not mandatory and generation of chips could be limited to some suitable subset of stages less than all three stages. Furthermore, although the example embodiment illustrated in FIG. 4 shows signatures being generated in each of the camera stage, the first computing device stage and the second computing device stage, this is not mandatory and alternatively signature generation could be limited to just the second computing device stage by itself, the second computing device stage and the camera stage only, or the second computing device stage and the first computing device stage only.

Therefore, the above discussed embodiments are considered to be illustrative and not restrictive, and the invention should be construed as limited only by the appended claims.

The invention claimed is:

1. A surveillance system comprising:
a camera that captures video frames;
a Video Management Software (VMS) server stored on a computer readable medium in a first computing device housed in a first enclosure, the first computing device communicatively coupled to the camera; and
a second computing device housed in a second enclosure different than the first enclosure, the second computing device being communicatively coupled to the first computing device and having a GPU processing power that is higher than a GPU processing power possessed by the first computing device, and
wherein:
the second computing device is an analytics appliance configured to generate multi-dimensional feature vectors corresponding to objects of interest in the video frames and return the generated multi-dimensional feature vectors to the first computing device for storage and use therein, and
the generated multi-dimensional feature vectors are generated at least in part by a learning machine that spans at least two GPU cards of the plurality of GPU cards.

2. The surveillance system as claimed in claim 1 wherein the learning machine comprises a convolution neural network.

3. A method comprising:
generating a plurality of chips from video frames captured by a camera that is communicatively coupled to a first computing device within a surveillance system;
transmitting the chips, from the first computing device and over a Local Area Network (LAN), to a second computing device having a Graphics Processing Unit (GPU) processing power that is higher than a GPU processing power possessed by the first computing device, and wherein the second computing device is an analytics appliance;
employing the GPU processing power possessed by the second computing device to process the chips therein and generate respective multi-dimensional feature vectors; and
transmitting the generated signatures multi-dimensional feature vectors, from the second computing device and over the LAN, to the first computing device for storage and use therein, and
wherein the generated multi-dimensional feature vectors are generated at least in part by a learning machine that spans a plurality of GPUs of the second computing device.

4. The method as claimed in claim 3 wherein the learning machine comprises a convolution neural network.

* * * * *